US011979840B2

United States Patent
Selmi et al.

(10) Patent No.: US 11,979,840 B2
(45) Date of Patent: May 7, 2024

(54) METHOD FOR DETERMINING A PLURALITY OF POSSIBLE EMISSION POWER VALUES, METHOD FOR SELECTING FROM THIS PLURALITY OF POSSIBLE EMISSION POWER VALUES FOR AN UNCOORDINATED ACCESS TO THE COMMUNICATION MEDIUM

(71) Applicant: ORANGE, Issy-les-Moulineaux (FR)

(72) Inventors: Asma Selmi, Châtillon (FR); Jean Schwoerer, Châtillon (FR); Raphaël Visoz, Châtillon (FR); Jean-Pierre Cances, Châtillon (FR)

(73) Assignee: ORANGE, Issy-les-Moulineaux (FR)

( * ) Notice: Subject to any disclaimer, the term of this patent is extended or adjusted under 35 U.S.C. 154(b) by 177 days.

(21) Appl. No.: 17/613,820

(22) PCT Filed: May 11, 2020

(86) PCT No.: PCT/EP2020/062999
§ 371 (c)(1),
(2) Date: Nov. 23, 2021

(87) PCT Pub. No.: WO2020/239413
PCT Pub. Date: Dec. 3, 2020

(65) Prior Publication Data
US 2022/0240195 A1 Jul. 28, 2022

(30) Foreign Application Priority Data
May 24, 2019 (FR) ........................................ 1905472

(51) Int. Cl.
*H04W 52/28* (2009.01)
*H04W 52/22* (2009.01)

(52) U.S. Cl.
CPC ....... *H04W 52/283* (2013.01); *H04W 52/226* (2013.01)

(58) Field of Classification Search
CPC ............. H04W 52/282; H04W 52/226; H04W 52/247; H04W 52/16; H04L 5/0035
See application file for complete search history.

(56) References Cited

U.S. PATENT DOCUMENTS

| 11,570,729 | B2 * | 1/2023 | Kim ........................ H04B 7/088 |
| 2004/0266473 | A1 * | 12/2004 | Tsunehara ........... H04W 52/241 |
| | | | 455/135 |
| 2014/0016576 | A1 * | 1/2014 | Noh ..................... H04W 52/247 |
| | | | 370/329 |

OTHER PUBLICATIONS

International Search Report dated Jul. 14, 2020 for corresponding International Application No. PCT/EP2020/062999, May 11, 2020.

(Continued)

*Primary Examiner* — John J Lee
(74) *Attorney, Agent, or Firm* — David D. Brush; Westman, Champlin & Koehler, P.A.

(57) ABSTRACT

A method and user equipment to select an emission power from a set of possible emission powers depending on their location relative to a base station. In a 5G development scenario, a massive number of user equipment will be deployed. The data exchanged by this user equipment is mainly signalling data whose volume generates an overload of the network resources. A resource access scheme called uncoordinated resource access scheme reduces the volume of the exchanged data. So that the base station can decode all signals emitted by the user equipment, it is necessary to have a number of emission power levels greater than the number of user equipment. By proposing the user equipment to select an emission power from a set of possible emission powers depending on their location relative to the base (Continued)

Figure 1:
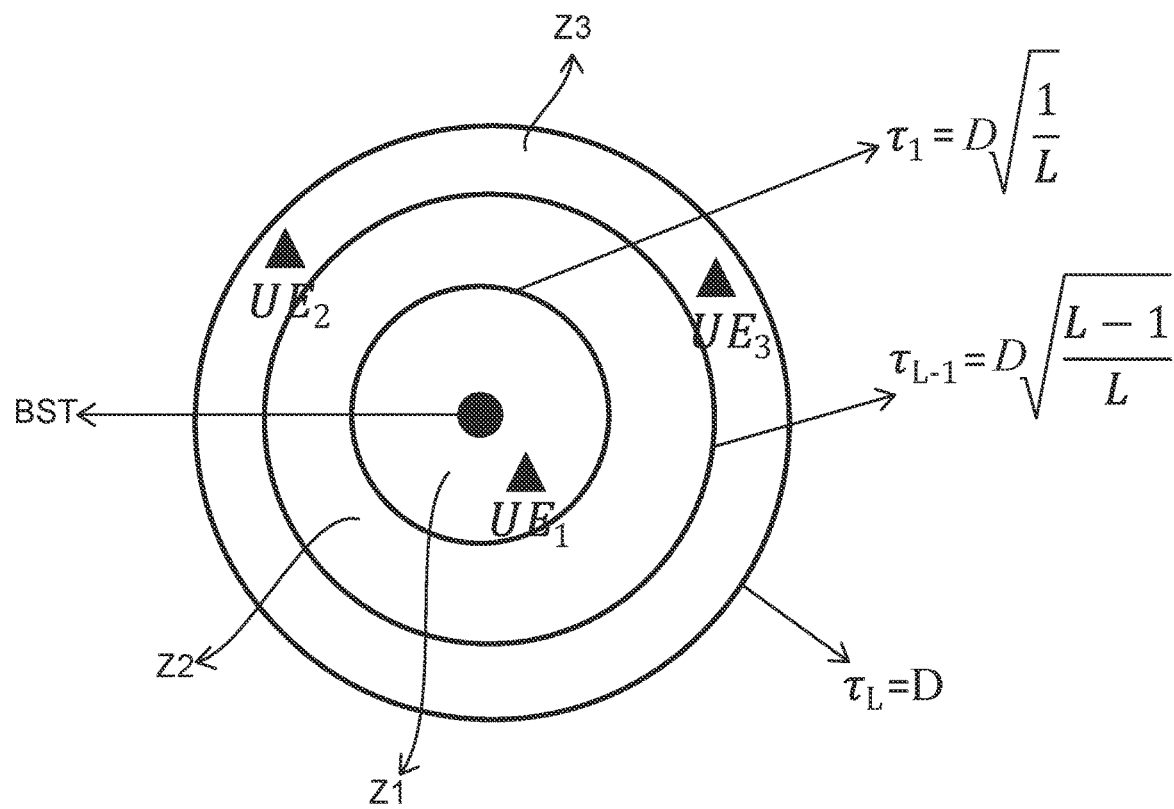

station, the solution allows the base station to decode the signals emitted by a greater number of user equipment.

13 Claims, 3 Drawing Sheets

(56) References Cited

OTHER PUBLICATIONS

Written Opinion of the International Searching Authority dated Jul. 14, 2020 for corresponding International Application No. PCT/EP2020/062999, filed May 11, 2020.
English translation of the Written Opinion of the International Searching Authority dated Jul. 20, 2020 for corresponding International Application No. PCT/EP2020/062999, filed May 11, 2020.
J. Choi, "NOMA-based random access with multichannel ALOHA," IEEE Journal on Selected Areas in Communications., vol. 35, No. 12, pp. 2736-2743, Dec. 2017.
H. S. Dhillon et al., "Fundamentals of throughput maximization with random arrivals for M2M communications," IEEE Transactions Communications, vol. 62, No. 11, pp. 4094-4109, Nov. 2014.

* cited by examiner

METHOD FOR DETERMINING A PLURALITY OF POSSIBLE EMISSION POWER VALUES, METHOD FOR SELECTING FROM THIS PLURALITY OF POSSIBLE EMISSION POWER VALUES FOR AN UNCOORDINATED ACCESS TO THE COMMUNICATION MEDIUM

CROSS-REFERENCE TO RELATED APPLICATIONS

This Application is a Section 371 National Stage Application of International Application No. PCT/EP2020/062999, filed May 11, 2020, which is incorporated by reference in its entirety and published as WO 2020/239413 A1 on Dec. 3, 2020, not in English.

FIELD OF THE INVENTION

The field of the invention is that of the management of the access to the communication medium as part of the deployment of the fifth generation of standards for mobile telephony or 5G.

More specifically, the invention relates to access to the communication medium by user equipment.

PRIOR ART AND ITS DRAWBACKS

The Internet of Things (or IoT) is the interconnection between the Internet and the objects called connected objects, such as, for example, sensors or probes.

One of the main 5G development scenarios is based on the IoT. In such a scenario, it is expected that a massive number of user equipment will be deployed. The explosion of the number of user equipment will result in an increase in data exchanges between this user equipment and telecommunication network access equipment such as base stations or access points.

The data exchanged by this user equipment with equipment located in a telecommunication network mainly consist of signalling messages whose volume generates a significant overload of the resources of the telecommunication network.

As the majority of the user equipment has only limited radio and energy resources, it is important to reduce the frequency of data exchanges as well as the volume of data exchanged with the access equipment.

In this context, one solution consists in the implementation of a scheme for accessing the resources of a telecommunication network called uncoordinated telecommunication network. An uncoordinated access scheme not only allows reducing the amount of resources used by the telecommunication network by reducing the number of signalling messages exchanged between the user equipment and the access equipment, but also not biasing the limited radio and energy resources of the user equipment beyond their capacities.

An example of an uncoordinated access scheme for the uplink direction, that is to say for communications from a user equipment to a base station, is described in the document J. Choi, "NOMA-based random access with multi-channel ALOHA", *IEEE Journal on Selected Areas in Commun.*, vol. 35, no. 12, pp.2736-2743, Dec. 2017. In this document, a NOMA (Non-Orthogonal Multiple Access) type scheme is implemented in conjunction with a multi-channel random access protocol such as the ALOHA protocol.

FIG. 1 represents a cell of a radio communication network of radius D=1 km comprising a base station BST and K=200 user equipment $UE_N$, $N \in [1, \ldots, 200]$, identically distributed over the entire surface of the cell. Each active user equipment $UE_N$ that is to say that it exchanges data with the base station BST, is associated with a probability $p_a$ of access to the base station BST. Thus, at a given time, the cell has an effective average number of active user equipment $\overline{M} = E\{M\} = K p_a$.

The cell is subdivided into L=3 zones, called power zones Z1, Z2 and Z3, each associated with a reference emission power. With reference to FIG. 1, the power zones Z1, Z2 and Z3 are represented by concentric circles centred on the base station BST.

The power zones Z1, Z2 and Z3 are delimited by thresholds $\{\tau_l\}_{l=1}^{L}$, representing a distance from the base station BST. These thresholds $\tau_l$ are defined such that a user equipment $UE_N$ has an equal probability of being located in one of the power zones while satisfying the condition:

$$Pr(k \in Z_l) = \frac{1}{L}.$$

Considering the assumption that the user equipment is uniformly distributed in the cell and neglecting the effects of masks, these thresholds $\tau_l$ are given by:

$$\tau_l^2 - \tau_{l-1}^2 = \frac{D^2}{L}.$$

Taking $\tau_0=0$, comes:

$$\tau_l = D\sqrt{\frac{l}{L}} \text{ for } l=1,\ldots,L$$

In this solution, each user equipment $UE_N$ independently selects an emission power as well as a frequency sub-band of a radio signal that it will use to transmit data to the base station BST. The value of the emission power selected by a user equipment $UE_N$ depends on the average power gain of the transmission channel established between the user equipment $UE_N$ and the base station BST. The average power gain of the transmission channel is estimated, for example, using reference signals broadcast periodically by the base station BST to manage the access of the user equipment $UE_N$ to the telecommunication network as well as their mobility to other base stations.

The user equipment $UE_N$ has the possibility of transmitting data to the base station BST by transmitting radio signals in several different frequency bands. Such a set of frequency bands is called B. The index set of the active users which transmit in the frequency sub-band i is referred to as $\mathcal{J}_i$. With this assumption, the radio signals received by the base station BST are written in the form:

$$y_i = \sum_{k \in \mathcal{J}_i} h_{i,k} \sqrt{P_{i,k}} s_{i,k} + n_i \qquad (1)$$

where $h_{i,k}$ represents the transmission channel of the user equipment k in the frequency sub-band i, $P_{i,k}$ represents the transmission power allocated to the emission of a radio signal by the user equipment k in this frequency sub-band i and $S_{i,k}$ represents the modulated symbols transmitted by the user equipment k in this frequency sub-band i. The amount $n_i$ conventionally designates the additive noise of the transmission channel with $n_i \sim \mathcal{CN}(0, N_0)$.

The transmission channel $h_{i,k}$ can then be factorized into the following form:

$$h_{i,k} = \alpha_k \beta_{i,k} \text{ with: } \alpha_k \in \mathbb{R}^+, \beta_{i,k} \in \mathbb{C} \quad (2)$$

The amount $\alpha_k^2 = \mathbb{E}\{|h_{i,k}|^2\}$ is an attenuation corresponding to the large-scale fading coefficient of the user equipment k for all frequency sub-bands. The amount $\alpha_k^2$ takes into account the effect of remoteness of the user equipment k from the base station BST and a possible mask effect on the propagation of the radio signal due for example to the presence of an obstacle located between user equipment k and the base station BST.

The remoteness effect is characterised by a law in $A_0 d_k^{-\beta}$ where $0 < d_k \leq De$ is the distance between the user equipment k and the base station BST, $\beta$ is the exponent of the path loss, and $A_0$ is a constant.

The amount $\beta_{i,k}$ represents the small-scale fading coefficient of the user equipment k in the frequency sub-band i, it represents the multipath effect and the relationship:

$$\mathbb{E}\{|\beta_{i,k}|^2\} = 1$$

is satisfied.

In the remainder of the document, a simplifying assumption is made which consists in neglecting the rapid fading which amounts to saying that $\beta_{i,k}=1$. In addition, concerning the definition of the power zones Z1, Z2 and Z3, only the effect of the distance between a user equipment $UE_N$ and the base station BST is taken into account.

In this solution, each user equipment $UE_N$ chooses its power zone taking into account its remoteness from the base station BST. This effect is included in the estimated coefficient $\alpha_k^2$ from the reference signals transmitted by the base station BST When B frequency sub-bands are available and in each of them a NOMA process is applied, the number of transmission sub-channels is equal to B×L. Subsequently, only a given frequency sub-band is considered and its index is omitted for the sake of simplification of the notations.

A user equipment k being located at an effective distance $\tau_{l-1} < d_k \leq \tau_l$ from the base station BST selects a reference emission power $v_l$ for emitting a radio signal to the base station BST. Such a reference emission power $v_l$ is defined as follows:

$$v_l = \Gamma(V_l + 1) \quad (2)$$

where $\Gamma$ represents the minimum SINR (Signal plus Interferences to Noise Ratio) required to allow the decoding of the radio signal transmitted by the base station BST with a given transmission rate, that is to say a modulation and coding scheme of rate R in number of bits by use of b.p.c.u channel and where $V_l$ for $l \in [1, \ldots, L]$, is given by:

$$V_l = \sum_{m=l+1}^{L} v_m, l \in [1, L-1], \quad (3)$$

and for l=L, $V_L=0$

It comes, by recurrence using (2) and (3), that $$v_l = \Gamma(\Gamma+1)^{L-l}, l \in [1, L] \quad (4)$$

In other words, since $v_1 > v_2 > \ldots > v_L$ and $\tau_L > \tau_{L-1} > \ldots > \tau_1$, the user equipment $UE_N$ located away from the base station BST selects lower emission power levels than the user equipment $UE_N$ located close to the base station BST to emit radio signals to the latter.

The user equipment k, after having selected a reference emission power, transmits this radio signal with the following transmitted symbol emission power:

$$P_k = \frac{v_l}{\alpha_k^2} \quad (5)$$

The base station BST comprises a successive interference cancellation receiver which allows separating the different radio signals transmitted by the active user equipment $UE_N$ in the cell. By assuming a noise power normalised to one (i.e. $N_0=1$) and that all active user equipment $UE_N$ choose different emission power levels to emit radio signals to the base station BST, the base station BST is capable of error-free decoding all received radio signals with the minimum SINR ratio $\Gamma$.

The value of the SINR of a user equipment which has chosen an emission power is given by:

$$\frac{v_l}{\sum_{m=l+1}^{L} v_m + 1} \quad (6)$$

which corresponds to the minimum SINR ratio $\Gamma$ when the equations (2) and (3) are applied.

By considering a transmission rate $R=\log_2(\Gamma+1)$, all radio signals transmitted by the active user equipment $UE_N$ can then be iteratively decoded by the base station by implementing a successive interference cancellation method in descending order.

In this solution, in order for the BST base station to be able to decode all radio signals emitted by the M active user equipment $UE_N$, it is necessary to have a number of emission power levels L greater than or equal to M. In addition, there should be at most one user equipment $UE_N$ per power zone. Thus, in order to be able to meet the connectivity needs in a cell of a 5G-compliant telecommunication network, L must be in the range of a few dozen or even a few hundred levels. This assumption leads to the use of exponential transmission power levels depending on L as indicated by the equation (4) above. The use of such emission power levels exceeds the capacity of the used user equipment $UE_N$ which are generally sensors with limited capacities due to the low costs of this equipment.

Even if the emission power levels were judiciously chosen in order to ensure a SINR diversity guaranteeing the decoding of all superimposed signals received by the base station BST, the deviation between two successive emission power levels remains large and increases with L.

Moreover, in the solution described above, it is assumed that the user equipment $UE_N$ have knowledge of the value of $|h_{i,k}|^2$ while, in practice, the user equipment $UE_N$ have only knowledge of the value of the coefficient $\alpha_k^2$. Thus, such a solution seems difficult to apply in the case of massive access of objects connected to the resources of a telecommunication network.

There is consequently a need for a solution allowing a massive access of user equipment to the resources of a telecommunication network not having these drawbacks.

DISCLOSURE OF THE INVENTION

The invention meets this need by proposing a method for selecting an emission power value of a radio signal implemented by at least one user equipment located in a first emission power zone defined around a base station to which said user equipment is attached, said method comprising:
  obtaining a plurality of possible emission power values for said first emission power zone, said possible emission power values for said first zone being determined depending on at least:
  one reference emission power value for said first emission power zone,
  one reference emission power value for at least one second emission power zone defined around said base station and adjacent to the first emission power zone,
  one value of a discretisation step defining a level of disparity between the possible power values per power zone, and
  selecting an emission power value from said plurality of possible emission power values for said first emission power zone.

By proposing the different user equipment to be able to select an emission power value from a set of possible emission power values depending on their location relative to the base station, the solution of the invention allows the base station to decode the radio signals emitted by a greater number of user equipment.

Such a solution allows, consequently, a massive user equipment access to the resources of a telecommunication network while limiting the risks of failure of a decoding of the radio signals received by the base station.

According to a first variant of the selection method, the selection of an emission power value from said plurality of possible emission power values for said first emission power zone is done according to a discrete probability distribution.

Thus, this limits the risk that different user equipment located in the same emission power zone selects the same emission power value. This solution allows ensuring that each user equipment accesses the resources of the telecommunication network.

According to a second variant of the selection method, obtaining the plurality of possible emission power values for said first emission power zone consists in receiving at least one message emitted by the base station comprising said plurality of possible emission power values for said first emission power zone This solution is of interest when the user equipment is, for example, a sensor type connected object with limited calculation capacities.

According to a combination of the first and second variants of the selection method, at least one message emitted by the base station also comprises the discrete probability distribution according to which an emission power value is selected from said plurality of possible emission power values for said first emission power zone.

According to a third variant of the selection method, obtaining the plurality of possible emission power values for said first emission power zone consists in:
  receiving at least one message emitted by the base station comprising, among others, the reference emission power value for said first emission power zone, the reference emission power value for at least one second emission power zone defined around said base station and adjacent to the first emission power zone, a value of a discretisation step defining a level of disparity between the possible power values,
  determining said possible emission power values for said first zone depending on the data included in said at least one received message.

In such an implementation, the user equipment itself performs all calculations instead of the base station. This allows resources at the base station to be freed.

According to a combination of the first and third variants of the selection method, said selection method further comprises determining the discrete probability distribution according to which an emission power value is selected from said plurality of possible emission power values for said first emission power zone depending on parameters relating to said discrete probability distribution included in the at least one received message.

According to a fourth variant of the selection method, the selection method comprises prior to obtaining:
  measuring reference radio signals transmitted by the base station
  determining a coefficient $\alpha_k^2$ depending on the reference signals
  determining, depending on the coefficient $\alpha_k^2$, an effective distance separating the user equipment from the base station, said effective distance identifying the emission power zone in which the user equipment is located.

The invention also relates to a method for determining a plurality of possible emission power values of a radio signal, said radio signal being intended to be emitted by at least one user equipment located in a first emission power zone defined around a base station to which said user equipment is attached, said method being implemented by the base station and comprising:
  determining the plurality of possible emission power values for said first emission power zone, said possible emission power values for said first zone being determined depending on at least:
  one reference emission power value for said first emission power zone,
  one reference emission power value for at least one second emission power zone defined around said base station and adjacent to the first emission power zone,
  one value of a discretisation step defining a level of disparity between the possible power values, and
  transmitting said plurality of possible emission power values for said first emission power zone to said at least one user equipment.

According to a second variant of the determination method, it further comprises:
  determining a discrete probability distribution according to which said at least one user equipment selects an emission power value from said plurality of possible emission power values for said first emission power zone, transmitting said discrete probability distribution to said at least one user equipment.

Another object of the invention is a user equipment located in a first emission power zone defined around a base station to which it is attached, said user equipment comprising at least one processor configured to:
  obtain a plurality of possible emission power values of a radio signal for said first emission power zone, said possible emission power values of a radio signal for said first zone being determined depending on at least:
  one reference emission power value for said first emission power zone,
  one reference emission power value for at least one second emission power zone defined around said base station and adjacent to the first emission power zone,
  one value of a discretisation step defining a level of disparity between the possible power values, and
  select an emission power value of a radio signal from said plurality of possible emission power values of a radio signal for said first emission power zone.

Such a user equipment can be a mobile phone or a connected object such as a temperature sensor, a motion sensor, a connected car, etc.

The invention also relates to a base station capable of determining a plurality of possible emission power values of a radio signal, said radio signal being intended to be emitted by at least one user equipment located in a first emission power zone defined around said base station to which said user equipment is attached, the base station comprising at least one processor configured to:
  determine the plurality of possible emission power values for said first emission power zone, said possible emission power values for said first zone being determined depending on at least:
  one reference emission power value for said first emission power zone,
  one reference emission power value for at least one second emission power zone defined around said base station and adjacent to the first emission power zone,
  one value of a discretisation step defining a level of disparity between the possible power values, and
  transmit said plurality of possible emission power values for said first emission power zone to said at least one user equipment.

Finally, the invention relates to computer program products comprising program code instructions for implementing the methods as previously described, when they are executed by a processor.

The invention also relates to a recording medium readable by a computer on which computer programs are recorded, comprising program code instructions for the execution the methods according to the invention as described above.

Such a recording medium can be any entity or device capable of storing the programs. For example, the medium may include a storage means, such as a ROM, for example a CD ROM or a microelectronic circuit ROM, or else a magnetic recording means, for example a USB key or a hard disk.

On the other hand, such a recording medium can be a transmissible medium such as an electrical or optical signal, which can be conveyed via an electrical or optical cable, by radio or by other means, such that the computer programs it contains can be executed remotely. The programs according to the invention can in particular be downloaded over a network, for example the Internet network.

Alternatively, the recording medium can be an integrated circuit in which the programs are incorporated, the circuit being adapted to execute or to be used in the execution of the aforementioned methods of the invention.

LIST OF FIGURES

Figure 2:
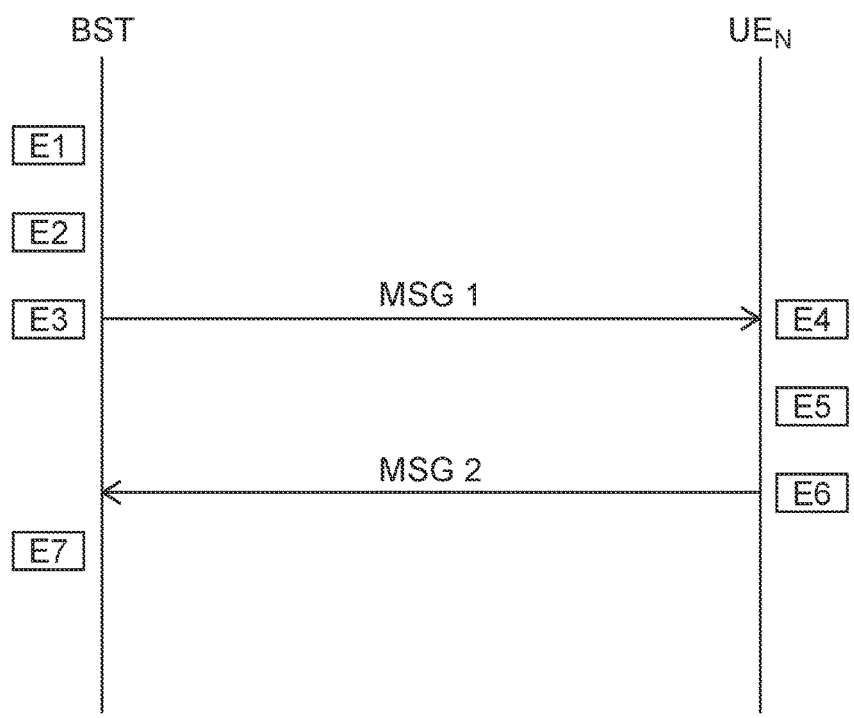
Figure 3:
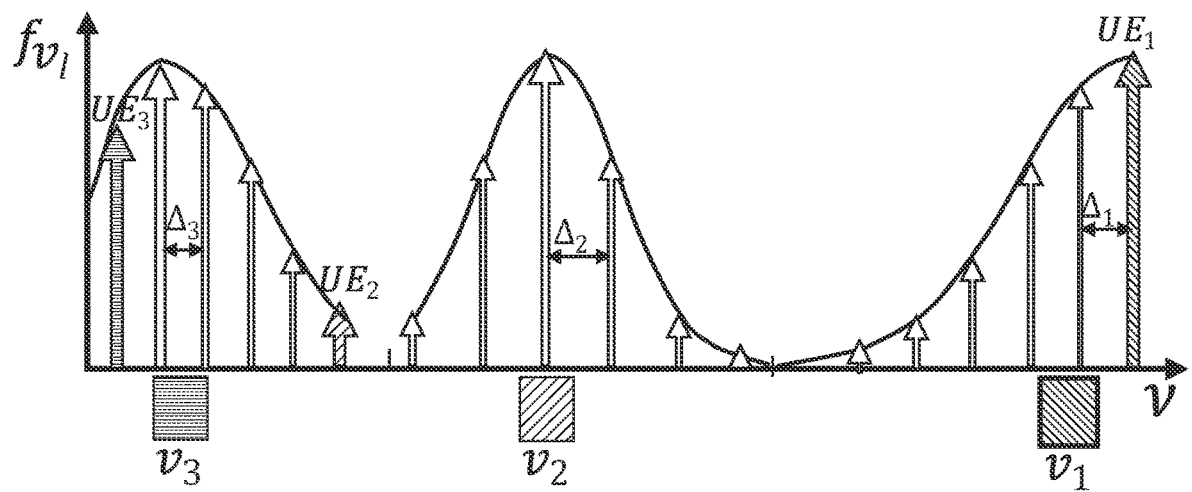
Figure 4:
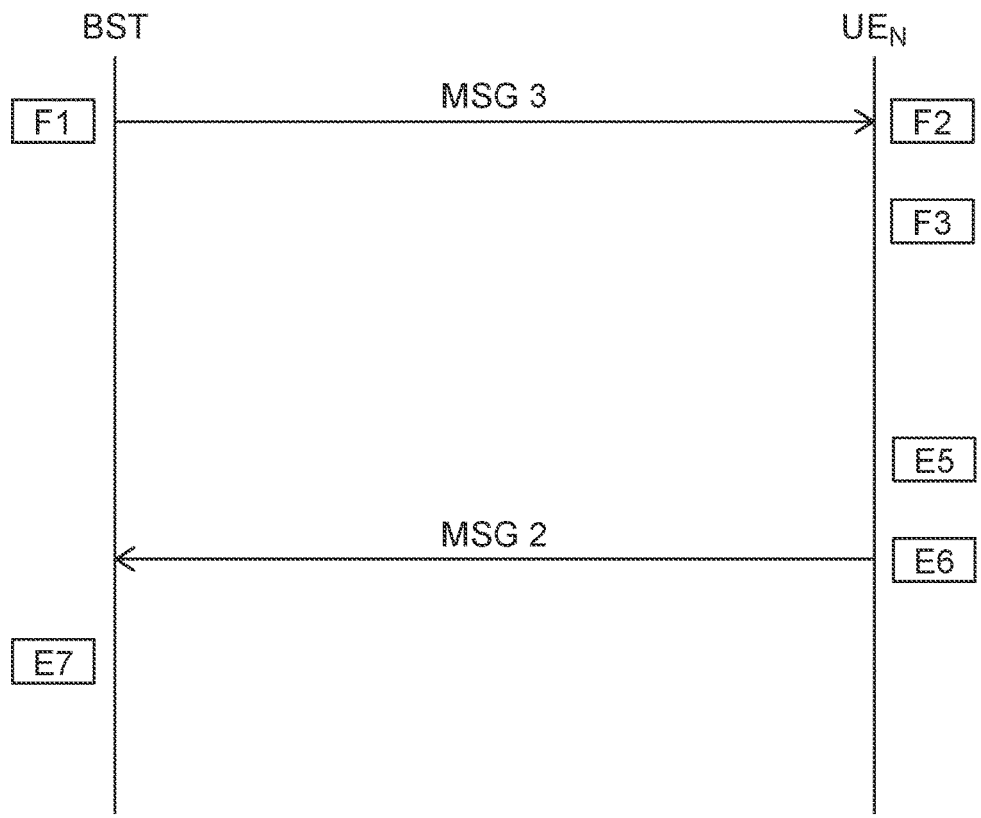
Figure 5:
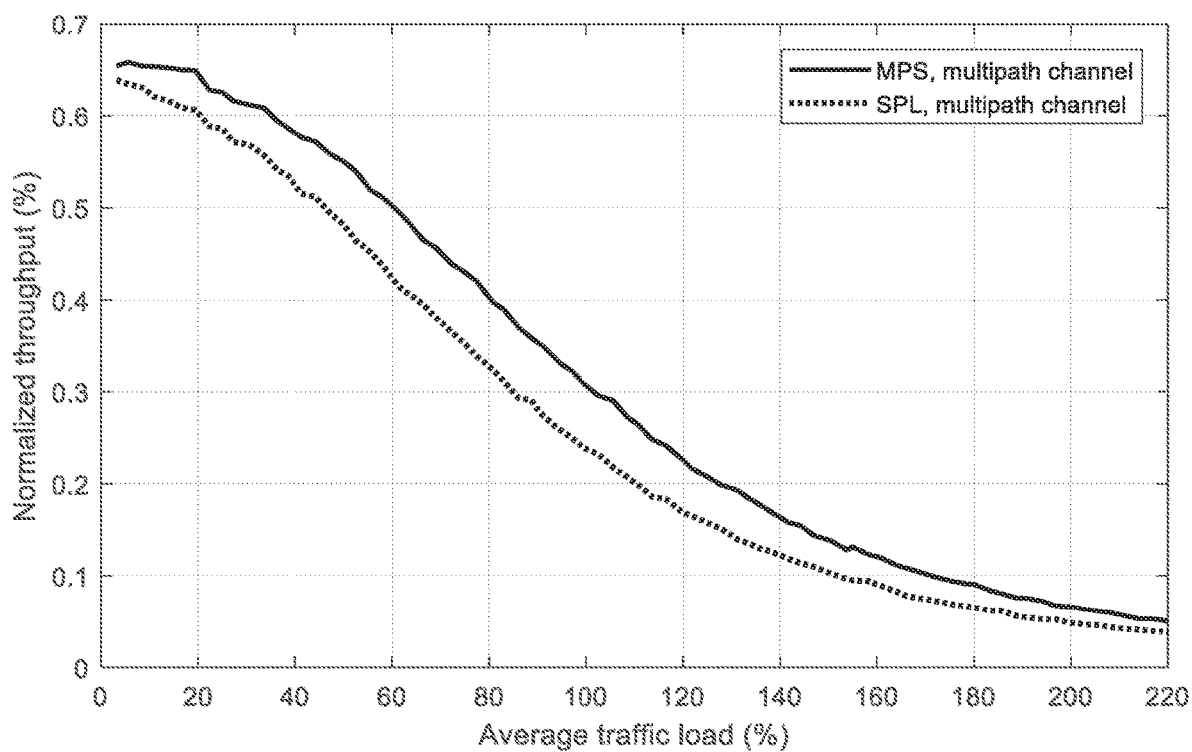
Figure 6:
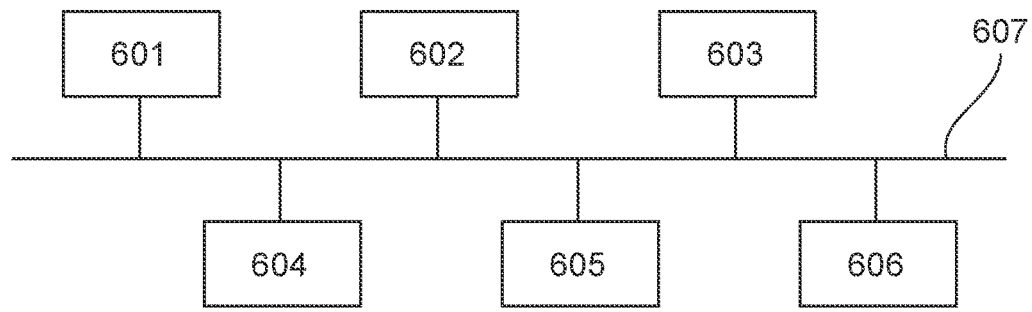
Figure 7:
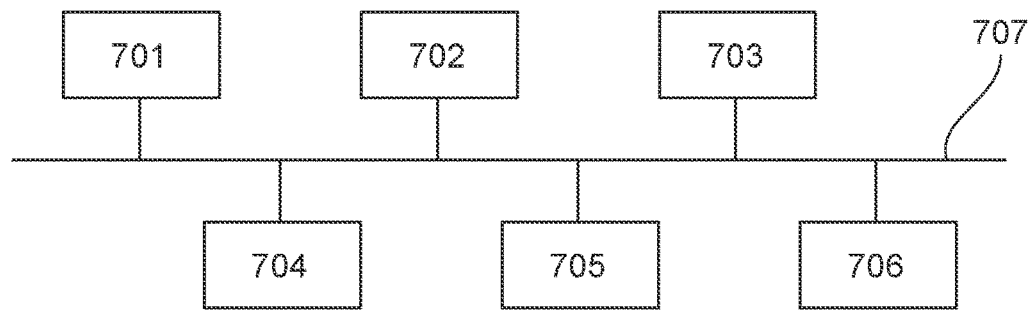

Other aims, features and advantages of the invention will emerge more clearly on reading the following description, given by way of simple illustrative, and not limiting, example in relation to the figures, from which:

FIG. 1: this figure represents a cell of a radio communication network in which a state-of-the-art solution is implemented, FIG. 2: this figure represents the steps of a method for selecting an emission power value of a radio signal according to a first embodiment of the invention, FIG. 3: this figure represents a probability mass function $\mathcal{P}(\cdot)$, FIG. 4: this figure represents the steps of a method for selecting an emission power value of a radio signal according to a second embodiment of the invention, FIG. 5: this figure represents the average number of user equipment $UE_N$ that successfully transmit their data packets, or normalised throughput in the figure, depending on the network load, or average traffic load in the figure, FIG. 6: this figure represents a user equipment according to one embodiment of the invention, FIG. 7: this figure represents a base station according to an embodiment of the invention.

DETAILED DESCRIPTION OF EMBODIMENTS OF THE INVENTION

The invention is also implemented in a cell of a radio communication network of radius D comprising a base station BST and K user equipment $UE_N$, $N \in [1, \ldots, K]$, identically distributed over the entire surface of the cell as described with reference to FIG. 1. Each active user equipment $UE_N$, that is to say that it exchanges data with the base station BST, is associated with a probability of access to the base station BST $p_a$. Thus, at a given time, the cell includes an effective average number of active user equipment $\overline{M} = E\{M\} = K p_a$. The cell is subdivided into L=3 zones, called power zones Z1, Z2 and Z3, each associated with a reference emission power.

The power zones Z1, Z2 and Z3 are delimited by thresholds $\{\tau_l\}_{l=1}^{L}$, representing a distance from the base station BST. These thresholds $\tau_l$ are defined such that a user equipment $UE_N$ has an equal probability of being located in one of the power zones Z1, Z2 and Z3 while satisfying the condition:

$$Pr(k \in Z_1) = \frac{1}{L},$$

under the assumption of a uniform distribution of the user equipment $UE_N$ in the cell.

The general principle of the invention is based on the fact that each power zone Z1, Z2 and Z3 is associated with a set of $n_l$ discrete emission power values, called possible power values, located around the value of a reference emission power $v_l$ of the considered power zone. Each user equipment $UE_N$ located in a power zone Z1, Z2 and Z3 selects an emission power value X from the possible power values $\{v_{l,n}\}_{n=1}^{n_l}$.

The possible power values are distributed around the value of a reference emission power $v_l$ according to a discrete probability distribution $f_{v_l} = \{Pr(X=v_{l,1}), \ldots, Pr(X=v_{l,n_l})\}$ where $Pr(X=v_{l,n})$ gives the probability that a user equipment $UE_N$ located in the power zone whose reference emission power is $v_l$ selects an emission power value equal to $v_{l,n}$.

The cell being divided into three power zones Z1, Z2 and Z3, there are therefore L=3 distinct emission power levels. In the remainder of the document, there is $M_i$=3 user equipment for a considered frequency sub-band i.

The three power zones Z1, Z2 and Z3 are associated with the possible emission power values $\{v_{1,n}\}_{n=1}^6$, $\{v_{2,n}\}_{n=1}^6$ and $\{v_{3,n}\}_{n=1}^6$. The possible emission power values respectively follow discrete probability distributions $f_{v_1}$, $f_{v_2}$ and $f_{v_3}$.

FIG. 2 represents the steps of a method for selecting an emission power value of a radio signal according to a first embodiment of the invention.

In a step E1, the base station BST determines the different possible emission power values for the different emission power zones Z1, Z2, Z3.

To do this, the base station BST first determines a range $I_l$ in which the possible emission power values are spread.

The values of the bounds of the range $I_l$ are given by:

$$I_l = \begin{cases} \left[v_l - \frac{v_l - v_{l+1}}{2} v_l + \frac{v_{l-1} - v_l}{2}\right], v_0 = v_1 \text{ for } l = 1 \ldots L-1 \\ \left[V_l v_l + \frac{v_{l-1} - v_l}{2}\right] \text{ for } l = L \end{cases} \quad (7)$$

The number of possible emission power values for a given emission power zone Z is chosen such as to respect the proportionality between the two ranges $$\left[\frac{v_l - v_{l+1}}{2} v_l\right] \text{ and } \left[v_l \frac{v_{l-1} - v_l}{2}\right]$$

located on both sides of the probability distribution centred around the value of the reference power $v_l$ of the range bounds $I_l$.

The maximum number of possible emission power values for each emission power zone Z is for example equal to the average number $\overline{M}$ of active user equipment $UE_N$.

Knowing the maximum number of possible emission power values for an emission power zone Z and knowing the bounds of the range $I_l$, the base station BST then determines the different possible emission power values for an emission power zone Z. For this, a discretisation step $$\Delta_l = \frac{T_l}{\overline{M}},$$

where $T_l$ represents the width of the range $I_l$, is determined for an emission power zone Z. Such a discretisation step $\Delta_l$ allows offering a certain level of disparity between the possible power values thus increasing the probability that the base station BST separates all radio signals received in view of their decoding.

A minimum discretisation step threshold independent of the value $\overline{M}$, noted $\Delta$, is defined. If the discretisation step $\Delta_l$ is less than or equal to the minimum discretisation step threshold $\Delta$, then, it is the minimum discretisation step threshold value $\Delta$ which is used to determine the different possible emission power values for the emission power zone Z in order to guarantee a minimum level of disparity between the possible power values in each emission power zone Z.

In a step E2, the base station BST determines a discrete probability distribution according to which the user equipment $UE_N$ located in a given emission power zone select an emission power value from the plurality of possible emission power values for the emission power zone in which they are located.

In the following example, the discrete probability distribution according to which the user equipment $UE_N$ select an emission power value from the plurality of possible emission power values is a normal distribution of the discrete values. Of course, any discrete probability distribution can be used when implementing the selection method according to the first embodiment of the invention.

Thus, for a normal distribution, the probability mass function $\mathcal{P}(\cdot)$ of a possible emission power value $v_{l,n}$ is given by:

$$\mathcal{P}(X = v_{l,n}) = f(v_{l,n} \backslash v_l, \sigma_l) = \frac{1}{A} \frac{1}{\sqrt{2\Pi\sigma_l^2}} e^{-\frac{(v_{l,n} - v_l)^2}{2\sigma_l^2}} \quad (8)$$

where A is a valid normalisation constant which is $$A = \sum_{n=1}^{n_l} \frac{1}{\sqrt{2\Pi\sigma_l^2}} e^{-\frac{(v_{l,n} - v_l)^2}{2\sigma_l^2}}.$$

The deviation of the Gaussian $\sigma_l$, is chosen, for example, such that 68% of the possible emission power values is comprised in the range $[v_l - \sigma_l^2 v_l + \sigma_l^2]$.

Such a probability mass function $\mathcal{P}(\cdot)$ is represented in FIG. 3.

The calculations performed by the base station BST during steps E1 and E2 correspond to the following algorithm:

---

If $\Delta_l \geq \Delta$, $n_l^- \leftarrow \left\lceil \frac{v_{l-1} - v_l}{v_{l-1} - v_{l+1}}(\overline{M} - 1) \right\rceil$ where $n_l^-$ represents the number of possible emission power values greater than $v_l$ and the notation $\lceil \cdot \rceil$ means rounded to the nearest next integer value Discretize $[v_l - (\overline{M} - 1 - n_l^-)\Delta_l v_l + \Delta_l n_l^-]$ using $\Delta_l$ Output: $\{v_{l,n}\}_{n=1}^{n_l} \sim f_{v_l} = \{\mathcal{P}(X = v_{l,n})\}_{n=1}^{n_l}$ Else Discretize $\left[v_l - \frac{v_l - v_{l+1}}{2} v_l + \frac{v_{l-1} - v_l}{2}\right]$ using $\Delta$ Output: $\{v_{l,n}\}_{n=1}^{n_l} \sim f_{v_l} = \{\mathcal{P}(X = v_{l,n})\}_{n=1}^{n_l}$ End

---

In a step E3, the base station BST broadcasts at least one message MGS1 to the user equipment $UE_N$. The message MSG1 includes the different possible emission power values for each of the emission power zones Z1, Z2 and Z3 as well as the corresponding probability mass functions $\mathcal{P}(X=v_{l,n})$.

In a step E4, a user equipment $UE_N$ receives the message MGS1 broadcast by the base station BST.

In a step E5, a user equipment $UE_N$ selects an emission power value from the possible emission power values for the emission power zone in which it is located.

In a step E6, a user equipment $UE_N$ transmits a radio signal with the transmitted symbol emission power corresponding to the value of the possible emission power selected during step E5.

Prior to each emission of a radio signal, a user equipment $UE_N$ updates the value of the coefficient $\alpha_k^2$ based on reference radio signals transmitted by the base station BST. The coefficient $\alpha_k^2$ represents, among other, a mask effect which may be due to the presence of an obstacle located between the user equipment $UE_N$ and the base station BST, and the remoteness of the user equipment $UE_N$ from the base station BST. Such a mask effect is generally characterised by a log-normal distribution:

$$f(x; \mu, \sigma) = \frac{1}{x\sigma\sqrt{2\pi}} \exp\left[-\frac{(\ln(x)-\mu)^2}{2\sigma^2}\right]$$

The user equipment $UE_N$ deduces from the value of the updated coefficient $\alpha_k^2$ the effective distance $d_k$ which separates it from the base station BST as well as the emission power zone in which it is located as follows:

$$d_k = \left(\frac{A_0}{\alpha_k^2}\right)^{\frac{1}{\beta}}$$

If the value of the selected possible emission power $P_k$ is strictly greater than a maximum power value $P_{max}$ of the user equipment $UE_N$ then the user equipment $UE_N$ transmits the radio signal with an emission power whose value is $P_{max}$. The SINR associated with this radio signal is then calculated as follows $$\bar{\gamma}_k = \frac{P_{max}\alpha_k^2}{\sum_{m=l+1}^{L} v_m + 1}$$

In one example implementation, on receipt of the message MSG1, the user equipment $UE_1$, located in the emission power zone Z1, selects the emission power value $v_{1,6} = v_1$, while the user equipment $UE_2$ and $UE_3$ both located in the emission power zone Z3, respectively select the possible emission power values $v_{3,1}$ and $v_{3,6}$ which are distinct from each other.

The three user equipment $UE_1$, $UE_2$ and UE3 each send a message MGS2 to the base station. These three messages are emitted respectively to the emission powers $v_1$, $v_{3,1}$ and $v_{3,6}$.

In a step E7, the base station BST receives the radio signals emitted by the three user equipment $UE_1$, $UE_2$ and $UE_3$.

The successive interference cancellation process implemented by the base station BST begins by decoding the radio signal emitted by the user equipment $UE_1$ because it is the one having the maximum received power.

The SINR associated with this radio signal is calculated as follows:

$$\gamma_1 = \frac{P_1\alpha_1^2}{P_2\alpha_2^2 + P_3\alpha_3^2 + 1} = \quad (9)$$

-continued
$$\frac{v_{1,6}}{v_{3,6} + v_{3,1} + 1} = \frac{v_1}{v_3 + 4\Delta_3 + v_3 - \Delta_3 + 1} = \frac{\Gamma(\Gamma(v_3+1) + v_3 + 1)}{2v_3 + 3\Delta_3 + 1}$$

It appears that the SINR $\gamma_1$ of the radio signal emitted by the user equipment $UE_1$ is strictly greater than $\Gamma$ if $$\Delta_3 \leq \frac{\Gamma^2}{3}.$$

For $\Gamma=6$ dB and $\Delta=1$, it is verified that $\Delta_3=1.997>\Delta$. In this case the condition $$\Delta_3 \leq \frac{\Gamma^2}{3}$$

is satisfied and the radio signal transmitted by the user equipment $UE_1$ is successfully decoded by the base station BST.

Having parameters representing the transmission channel established between it and the user equipment $UE_1$, the base station BST can then subtract the signal emitted by the user equipment $UE_1$ already decoded from the other received radio signals.

The base station BST then proceeds to the decoding of the second radio signal whose emission power at the highest value, that is to say the radio signal emitted by the user equipment $UE_2$.

The SINR associated with this radio signal emitted by the user equipment $UE_2$ is calculated as follows $$\gamma_2 = \frac{P_2\alpha_2^2}{P_3\alpha_3^2 + 1} = \frac{v_{3,6}}{v_{3,1} + 1} = \frac{v_3 + 4\Delta_3}{v_3 - \Delta_3 + 1} = \frac{\Gamma + 4\Delta_3}{\Gamma - \Delta_3 + 1} \quad (10)$$

The base station BST can decode this second radio signal if $\gamma_2 \geq \Gamma$. This condition is satisfied since $\gamma_2=4.01$ and that $\Gamma=3.98$.

The radio signal emitted by the user equipment $UE_3$ for its part cannot be decoded by the base station BST after the subtraction of the radio signal emitted by the user equipment $UE_2$ because $\gamma_3=\Gamma-\Delta_3$ and is therefore strictly less than $\Gamma$.

If the maximum emission power of a user equipment k is less than the value of the selected possible emission power associated $$P_k = \frac{v_{l,n}}{\alpha_k^2}$$

with the target SINR $\Gamma$ then the user equipment k decreases the value of SINR until reaching the value of the maximum target SINR that it can reach by considering that all power levels $v_m$, m>l are occupied, that is to say by considering that all user equipment associated with the emission power levels m<l have been subtracted by the base station BST during decoding. Thus, the user equipment k adapts its transmission rate $R_k$ proportionally to the value of the estimated reception SINR $\gamma_k$ in the case where there are no possible emission power values and for a transmission at full power $P_{max}$ $$\gamma_k = \frac{P_{max}\alpha_k^2}{\sum_{m=l+1}^{L} v_m + 1}$$

with in the ideal case given by the information theory $$R_k = \log_2(1 + \gamma_k)$$

It should be noted that this user equipment generates less interference on the other user equipment than when it transmits with the possible emission power $$P_k = \frac{v_{l,n}}{\alpha_k^2}.$$

Indeed, the user equipment then transmits at an emission power lower than that initially determined based on the value of the target SINR Γ in the case where there are possible emission power values, without its emission interfering with the decoding of the radio signals transmitted by other user equipment.

When the base station BST is unable to decode the superimposed signals in a given frequency sub-band, it requests their retransmission by sending a negative acknowledgment message or NACK to the concerned connected objects $UE_N$. When retransmitting these radio signals, the concerned user equipment $UE_N$ selects possible power values different from those chosen for the first transmission in order to improve the chances of a successful decoding by the base station BST.

FIG. 4 represents the steps of a method for selecting an emission power value of a radio signal according to a second embodiment of the invention.

In a step F1, the base station BST broadcasts at least one message MSG3 to the user equipment $UE_N$. The message MSG3 comprises, among others, the reference emission power values for the different emission power zones Z1, Z2 and Z3, the average number of active user equipment located in the different emission power zones Z1, Z2 and Z3.

In a step F2, the user equipment $UE_N$ determines the different possible emission power values for the different emission power zones Z1, Z2, Z3.

To do this, the user equipment $UE_N$ first determines a range $I_l$ in which the possible emission power values of an emission power zone Z spread.

The values of the bounds of the range $I_l$ are given by:

$$I_l = \begin{cases} \left[ v_l - \frac{v_l - v_{l+1}}{2} v_l + \frac{v_{l-1} - v_l}{2} \right], v_0 = v_1 \text{ for } l = 1 \ldots L-1 \\ \left[ v_l v_l + \frac{v_{l-1} - v_l}{2} \right] \text{ for } l = L \end{cases} \quad (7)$$

The number of possible emission power values for a given emission power zone Z is chosen so as to respect the proportionality between the two ranges $$\left[ \frac{v_l - v_{l+1}}{2} v_l \right] \text{ and } \left[ v_l \frac{v_{l-1} - v_l}{2} \right]$$

located on both sides of the probability distribution centred around the value of the reference power $v_l$ of the range bounds $I_l$.

The maximum number of possible emission power values for each emission power zone Z is for example equal to the average number $\overline{M}$ of active user equipment $UE_N$.

Knowing the maximum number of possible emission power values for an emission power zone Z and knowing the bounds of the range $I_l$, the user equipment $UE_N$ then determines the different possible emission power values for the emission power zone Z. For this, a discretisation step $$\Delta_1 = \frac{T_l}{\overline{M}},$$

where $T_l$ represents the width of the range $I_l$, e is determined for the emission power zone Z. Such a discretisation step $\Delta_l$ pe allows offering a certain level of disparity between the possible power values and allows increasing the probability for the base station BST to be able to separate all received radio signals.

A minimum discretisation step threshold, noted $\Delta$, is defined. If the discretisation interval $\Delta_1$ is less than or equal to the minimum discretisation step threshold, then, it is the minimum discretisation step threshold value $\Delta$ which is used to determine the different possible emission power values for the emission power zone Z.

In a step F3, the user equipment $UE_N$ determines a discrete probability distribution according to which, depending on the emission power zone in which it is located, it selects an emission power value from the plurality of possible emission power values for the emission power zone in which it is located.

In the following example, the discrete probability distribution according to which the user equipment $UE_N$ select an emission power value from the plurality of possible emission power values is a normal distribution of the discrete values. Of course, any discrete probability distribution can be used when implementing the selection method according to the first embodiment of the invention.

Thus, for a normal distribution, the probability mass function $\mathcal{P}(\cdot)$ of a possible emission power value $v_{l,n}$ is given by:

$$\mathcal{P}(X = v_{l,n}) = f(v_{l,n} \backslash v_l, \sigma_l) = \frac{1}{A} \frac{1}{\sqrt{2\Pi\sigma_l^2}} e^{-\frac{(v_{l,n}-v_l)^2}{2\sigma_l^2}} \quad (8)$$

where A is a normalisation constant which is $$A = \sum_{n=1}^{n_l} \frac{1}{\sqrt{2\Pi\sigma_l^2}} e^{-\frac{(v_{l,n}-v_l)^2}{2\sigma_l^2}}.$$

The deviation of the Gaussian $\sigma_l$, chosen, for example, such that 68% of the possible emission power values are comprised within the range $[v_l-\sigma_l^2, v_l+\sigma_l^2]$.

Such a probability mass function $\mathcal{P}(\cdot)$ is represented in FIG. 3.

The calculations performed by the user equipment $UE_N$ during steps F2 and F3 correspond to the following algorithm:

If $\Delta_l \geq \Delta$, $n_l^- \leftarrow \left\lceil \frac{v_{l-1} - v_l}{v_{l-1} - v_{l+1}} (\overline{M} - 1) \right\rceil$ where $n_l^-$ represents the number of possible emission power values greater than $v_l$, and the notation $\lceil . \rceil$ means rounded to the nearest next integer Discretize $[v_l - (\overline{M} - 1 - n_l^-) \Delta_l v_l + \Delta_l n_l^-]$ using $\Delta_l$ Output: $\{v_{l,n}\}_{n=1}^{n_l} - f_{v_l} = \{\mathcal{P}(X = v_{l,n})\}_{n=1}^{n_l}$ Else Discretize $\left[ v_l - \frac{v_l - v_{l+1}}{2} v_l + \frac{v_{l-1} - v_l}{2} \right]$ using $\Delta$ Output: $\{v_{l,n}\}_{n=1}^{n_l} - f_{v_l} = \{\mathcal{P}(X = v_{l,n})\}_{n=1}^{n_l}$ End The user equipment $UE_N$ then implements steps E5 and E6 described with reference to FIG. 2 and the base station BST implements step E7, also described with reference to FIG. 2.

FIG. 5 represents the average number of user equipment $UE_N$ which manage to successfully transmit their data packets, or normalised throughput in the Figure, depending on the network load, or average traffic load in the figure.

The network load is given by:

$$\text{traffic load} = \frac{M}{LB}$$

A Monte-Carlo simulation is applied by considering the following simulation parameters:

K=200 pieces of user equipment; D=1 Km; L=12 emission power levels; B=6 frequency sub-bands, Target transmission rate R=0.5 b.p.c.u corresponding to a target SINR Γ=3.8 dB, Transmission channel parameters: Block-fading Rayleigh channel that changes with each new transmission, but remains constant during the retransmissions associated with a given transmission; $A_0$=1; β=3.5, No power limitation at user equipment, The frequency sub-band is chosen independently and according to a uniform discrete probability distribution by user equipment, The possible emission power values per emission power zone Z are constructed with $\Delta = 10^{-4}$ SISO scheme; ARQ protocol truncated with maximum number of retransmissions Tr=10;

The transmissions are made with a recurrence of T=Tr

The results of this simulation are represented in FIG. 5 where the MPS (Multiple Power Shades) curve represents the average number of user equipment $UE_N$ which manage to successfully transmit their data packets depending on the network load when the method according to the invention is implemented; and SPL (Single Power Level) represents the average number of user equipment $UE_N$ which manage to successfully transmit their data packets depending on the load of the network when the method according to the prior art is implemented.

FIG. 6 represents a user equipment $UE_N$ according to one embodiment of the invention. Such a user equipment $UE_N$ is capable of implementing the different embodiments of the method described with reference to FIGS. 2 and 4.

A user equipment $UE_N$ can include at least one hardware processor 601, a storage unit 602, an input device 603, a display device 604, an interface 605, and at least one network interface 606 which are connected to each other through a bus 607. Of course, the constituent elements of the user equipment $UE_N$ can be connected by means of a connection other than a bus.

The processor 601 controls the operations of the user equipment $UE_N$. The storage unit 602 stores at least one program for implementing the method according to one embodiment of the invention to be executed by the processor 601, and various data, such as parameters used for calculations performed by the processor 601, intermediate data of calculations performed by the processor 601, etc. The processor 601 may be formed by any known and appropriate hardware or software, or by a combination of hardware and software. For example, the processor 601 can be formed by dedicated hardware such as a processing circuit, or by a programmable processing unit such as a Central Processing Unit which executes a program stored in a memory thereof.

The storage unit 602 may be formed by any appropriate means capable of storing the program(s) and data in a computer readable manner. Examples of storage unit 602 comprise computer-readable non-transitory storage media such as semiconductor memory devices, and magnetic, optical, or magneto-optical recording media loaded in a read and write unit.

The input device 603 may be formed by a keyboard, a pointing device such as a mouse to be used by a user to enter commands. The display device 604 can also be formed by a display module, such as for example a graphical user interface or GUI.

The interface 605 provides an interface between the user equipment $UE_N$ and other equipment not represented in the figure.

At least one network interface 606 provides a connection between the user equipment $UE_N$ and the base station BST via a radio connection.

FIG. 7 represents a base station BST according to one embodiment of the invention. Such a base station BST is capable of implementing the different embodiments of the method described with reference to FIGS. 2 and 4.

A base station BST can include at least one hardware processor 701, a storage unit 702, an input device 703, a display device 704, an interface 705, and at least one network interface 706 which are connected to each other through a bus 707. Of course, the constituent elements of the base station BST can be connected by means of a connection other than a bus.

The processor 701 controls the operations of the base station BST. The storage unit 702 stores at least one program for implementing the method according to one embodiment of the invention to be executed by the processor 701, and various data, such as parameters used for calculations performed by the processor 701, intermediate data of calculations performed by the processor 701, etc. The processor 701 may be formed by any known and appropriate hardware or software, or by a combination of hardware and software. For example, the processor 701 can be formed by dedicated hardware such as a processing circuit, or by a programmable processing unit such as a Central Processing Unit which executes a program stored in a memory thereof.

The storage unit 702 may be formed by any appropriate means capable of storing the program(s) and data in a computer readable manner. Examples of storage unit 702 comprise computer-readable non-transitory storage media such as semiconductor memory devices, and magnetic, optical, or magneto-optical recording media loaded in a read and write unit.

The input device 703 may be formed by a keyboard, a pointing device such as a mouse to be used by a user to enter commands. The display device 704 can also be formed by a display module, such as for example a graphical user interface or GUI.

The interface 705 provides an interface between the base station BST and another equipment not represented in the figure.

At least one network interface 706 provides a connection between the base station BST and at least one user equipment $UE_N$ via a radio connection.

The invention claimed is:

1. A method for selecting an emission power value of a radio signal implemented by at least one user equipment located in a first emission power zone defined around a base station to which said user equipment is attached, said method comprising:
    obtaining a plurality of possible emission power values for said first emission power zone, said possible emission power values for said first zone being determined depending on at least:
        one reference emission power value for said first emission power zone,
        one reference emission power value for at least one second emission power zone defined around said base station and adjacent to the first emission power zone, and
        one value of a discretization defining a level of disparity between the possible power values, and
    selecting the emission power value from said plurality of possible emission power values for said first emission power zone.

2. The method for selecting an emission power value of a radio signal according to claim 1, wherein selecting an emission power value from said plurality of possible emission power values for said first emission power zone is done according to a discrete probability distribution.

3. The method for selecting an emission power value of a radio signal according to claim 1, wherein obtaining the plurality of possible emission power values for said first emission power zone comprises receiving at least one message emitted by the base station comprising said plurality of possible emission power values for said first emission power zone.

4. The method for selecting an emission power value of a radio signal according to claim 3, wherein:
    selecting an emission power value from said plurality of possible emission power values for said first emission power zone is done according to a discrete probability distribution, and
    at least one of the messages emitted by the base station also comprises a discrete probability distribution according to which an emission power value is selected from said plurality of possible emission power values for said first emission power zone.

5. The method for selecting an emission power value of a radio signal according to claim 1, wherein obtaining the plurality of possible emission power values for said first emission power zone comprises:
    receiving at least one message emitted by the base station comprising, the reference emission power value for said first emission power zone, the reference emission power value for at least one second emission power zone defined around said base station and adjacent to the first emission power zone, the value of a discretization defining a level of disparity between the possible power values, and
    determining said possible emission power values for said first zone depending on the data included in said at least one received message.

6. The method for selecting an emission power value of a radio signal according to claim 5, wherein selecting an emission power value from said plurality of possible emission power values for said first emission power zone is done according to a discrete probability distribution, and wherein the method further comprises determining the discrete probability distribution according to which the emission power value is selected from said plurality of possible emission power values for said first emission power zone depending on parameters relating to said discrete probability distribution included in the at least one received message.

7. The method for selecting an emission power value of a radio signal according to claim 1, comprising prior to obtaining:
    measuring reference radio signals transmitted by the base station;
    determining a coefficient 4 depending on the reference signals; and
    determining, depending on the coefficient 4, an effective distance separating the user equipment from the base station, said effective distance identifying the emission power zone in which the user equipment is located.

8. A method for determining a plurality of possible emission power values of a radio signal to be emitted by at least one user equipment located in a first emission power zone defined around a base station to which said user equipment is attached, said method being implemented by the base station and comprising:
    determining the plurality of possible emission power values for said first emission power zone, said possible emission power values for said first zone being determined depending on at least:
        one reference emission power value for said first emission power zone,
        one reference emission power value for at least one second emission power zone defined around said base station and adjacent to the first emission power zone, and
        one value of a discretization defining a level of disparity between the possible power values, and
    transmitting said plurality of possible emission power values for said first emission power zone to said at least one user equipment.

9. The method for determining a plurality of possible emission power values of a radio signal according to claim 8 further comprising:
    determining a discrete probability distribution according to which said at least one user equipment selects an emission power value from said plurality of possible emission power values for said first emission power zone, and
    transmitting said discrete probability distribution to said at least one user equipment.

10. A user equipment located in a first emission power zone defined around a base station to which it is attached, said user equipment comprising:
    at least one processor configured to:
    obtain a plurality of possible emission power values of a radio signal for said first emission power zone, said possible emission power values of a radio signal for said first zone being determined depending on at least:
        one reference emission power value for said first emission power zone, one reference emission power value for at least one second emission power zone defined around said base station and adjacent to the first emission power zone, and one value of a discretization defining a level of disparity between the possible power values, and select the emission power value of a radio signal from said plurality of possible emission power values of a radio signal for said first emission power zone.

11. A base station comprising:

at least one processor configured to:

determine a plurality of possible emission power values of a radio signal to be emitted by at least one user equipment located in a first emission power zone defined around said base station to which said user equipment is attached, said possible emission power values for said first zone being determined depending on at least:
one reference emission power value for said first emission power zone,
one reference emission power value for at least one second emission power zone defined around said base station and adjacent to the first emission power zone, and
one value of a discretization defining a level of disparity between the possible power values, and transmit said plurality of possible emission power values for said first emission power zone to said at least one user equipment.

12. A non-transitory computer-readable medium comprising program code instructions stored thereon, which when executed by a processor of a user equipment, which is located in a first emission power zone defined around a base station to which said user equipment is attached, configure the user equipment to implement a method of selecting an emission power value of a radio signal, said method comprising:

obtaining a plurality of possible emission power values for said first emission power zone, said possible emission power values for said first zone being determined depending on at least:
one reference emission power value for said first emission power zone,
one reference emission power value for at least one second emission power zone defined around said base station and adjacent to the first emission power zone, and
one value of a discretization defining a level of disparity between the possible power values, and selecting the emission power value from said plurality of possible emission power values for said first emission power zone.

13. A non-transitory computer-readable medium comprising program code instructions stored thereon, which when executed by a processor of a base station, configure the base station to implement a method of determining a plurality of possible emission power values of a radio signal to be emitted by at least one user equipment located in a first emission power zone defined around the base station, to which said user equipment is attached, said method comprising:

determining the plurality of possible emission power values for said first emission power zone, said possible emission power values for said first zone being determined depending on at least:
one reference emission power value for said first emission power zone,
one reference emission power value for at least one second emission power zone defined around said base station and adjacent to the first emission power zone, and
one value of a discretization defining a level of disparity between the possible power values, and transmitting said plurality of possible emission power values for said first emission power zone to said at least one user equipment.

* * * * *